United States Patent
Koyama et al.

(10) Patent No.: US 6,422,939 B1
(45) Date of Patent: Jul. 23, 2002

(54) STORAGE MEDIUM FOR STORING AN APPLICATION PROGRAM FOR A CAR RACING GAME

(75) Inventors: Shigeo Koyama; Daizo Harada, both of Tokyo (JP)

(73) Assignee: Genki Co., Ltd., Tokyo (JP)

( * ) Notice: Subject to any disclaimer, the term of this patent is extended or adjusted under 35 U.S.C. 154(b) by 11 days.

(21) Appl. No.: 09/688,966

(22) Filed: Oct. 17, 2000

(30) Foreign Application Priority Data

Oct. 28, 1999 (JP) .......................... H11-306802

(51) Int. Cl.[7] .................................. A63F 9/24
(52) U.S. Cl. ............................. 463/6; 700/92
(58) Field of Search ................. 463/6, 7, 23, 30–31, 463/36–38, 43–44, 59–60; 700/90–92; 273/442, 444; 434/62, 64, 65

(56) References Cited

U.S. PATENT DOCUMENTS

| 5,354,202 | A | * | 10/1994 | Moncrief et al. .............. 434/69 |
| 5,816,913 | A | * | 10/1998 | Nakamura ...................... 463/6 |
| 6,117,007 | A | * | 9/2000 | Matsuyama et al. ........... 463/6 |
| 6,171,186 | B1 | * | 1/2001 | Kurosawa et al. ............ 463/31 |

* cited by examiner

Primary Examiner—Joe H. Cheng
Assistant Examiner—Kim T. Nguyen
(74) Attorney, Agent, or Firm—Lowe Hauptman Gilman & Berner, LLP

(57) ABSTRACT

A car racing game in which a player drives unrestrictedly on a racecourse until the start of a race. A race begins when a player passes an opposing car and is passed by the same car in return. The player loses points when trailing the leading car, based on the distance the player is behind, and also when colliding with walls or other cars. A player wins the race when the opposing car's points drop to zero.

10 Claims, 4 Drawing Sheets

STORAGE MEDIUM FOR STORING AN APPLICATION PROGRAM FOR A CAR RACING GAME

BACKGROUND OF THE INVENTION

1. Field of the Invention

The present invention relates to a storage medium for storing an application program for a car racing game. In the car racing game, a player controls movement of a car with a game controller while viewing a display of the race on a TV monitor and attempts to pass cars operated by opposing players.

2. Description of the Related Art

Conventional car racing games have predetermined starting and finishing points on a racecourse at which the race begins and ends, respectively. Normally, the order in which cars cross the finish line is used to determine the winner and losers of the race.

Since the starting and finishing points are set near the beginning and ending of the racecourse, these conventional games offer little freedom of movement to the players. Also, since the course of events during the race always occur in the same order, the novelty of the game tends to diminish over time. In addition, the game is likely to grow dull because the players must always drive over the entire course to the finish line in order to win the race. Single mistakes committed during a race have little effect on the outcome, thereby reducing the feeling of tension in the competition. Further, most conventional race games include several competing cars and are not suitable for one-on-one or one-on-two style racing.

SUMMARY OF THE INVENTION

In view of the foregoing, it is an object of the present invention to provide an application program for a car racing game supporting one-on-one or one-on-two style racing. It is another object of the present invention that the race has no predetermined starting and finishing points for beginning and ending the race. Instead the player drives freely over the racecourse until agreeing to begin a race with an opposing player, the race beginning from the point of agreement. Each player possesses points for continuing play. Points are decreased based on positional relationships with other cars, thereby enabling the state of the race to change rapidly and providing a feeling of tense competition in which one mistake can result in losing the race. The game ends whenever a player's points reach zero.

These objects and others will be attained by an application program for a car racing game comprising the following subprograms. A main menu subprogram enables the player to select a car for racing, change car parts, view information on opposing cars, change the functional arrangement of controller buttons, and the like before the player begins driving on a predetermined racecourse. A free driving subprogram enables the player to drive freely on a predetermined racecourse while searching for opponents until a race begins. A car racing subprogram implements passing and other aspects of a race from the point the race between the player and an opponent begins until the end of the race. An end-of-race processing subprogram displays results of the race, displays or saves a replay of the race, and allows the player to select whether to return to free driving or to the main menu. The car racing subprogram includes a race result determining subprogram for providing players with an initial point value at the beginning of the first race to enable the players to start and continue races, determining the positional relationship between cars and calculating the distance therebetween at prescribed periods, decreasing the points of a car trailing the leading car by a predetermined subtraction value corresponding to the distance between the cars, and determining the winner of the race when the opponent's points drop to 0 and ending the race at that point.

According to another aspect of the present invention, the free driving subprogram comprises a race start determining subprogram for starting a race from a point on the racecourse at which either the player passes an opposing car and is passed by the same opposing car in return or an opposing car passes the player and the player passes the same opposing car in return.

According to another aspect of the present invention, the free driving subprogram comprises a race start determining subprogram for starting a race from a point on the racecourse at which either the player flashes hazard lights at an opposing car or passes an opposing car and the same opposing car flashes hazard lights or passes the player in return, or an opposing car flashes hazard lights or passes the player and the player flashes hazard lights or passes the same opposing car in return.

According to another aspect of the present invention, a predetermined subtraction value is subtracted from a player's points in the race result determining subprogram based on the distance between cars and is a lower value when the distance between cars is small and a higher value when the distance between cars is large.

According to another aspect of the present invention, the subtraction value subtracted from a player's points SP is calculated by dividing the distance behind the leading car into a plurality of sections, each having a primary curve representing the subtraction value that grows at a different rate as the distance behind the leading car increases. The primary curve having the smallest growth rate is used to determine the subtraction value for a trailing car in a first section nearest the leading car, while primary curves having progressively larger growth rates are used to determine the subtraction value for a trailing car in a second or subsequent section farther from the leading car.

According to another aspect of the present invention, the points SP used in the race result determining subprogram are further decreased when a car contacts or collides with a wall or other car by a subtraction value proportional to the force of collision perpendicular to the wall or other car.

According to another aspect of the present invention, the force of collision perpendicular to the wall or other car collided with is calculated by the expression $(½)m(v \sin \theta)^2$ at prescribed periods when a car having a mass m and moving at a velocity v contacts or collides with the wall or other car at an angle $\theta$, and a subtraction value proportional to the calculated force of collision is subtracted from the points used in the race result determining subprogram.

According to another aspect of the present invention, the prescribed time is $\frac{1}{60}$ seconds, corresponding to the time for one frame to be displayed, or an integral multiple thereof.

According to another aspect of the present invention, a storage medium stores the application program for the car racing game. The storage medium comprises a CD-ROM, a DVD-ROM, or a ROM having a higher storage density than a CD-ROM with a capacity of at least 1 gigabyte per disc.

DESCRIPTION OF THE PREFERRED EMBODIMENTS

An application program for a car racing game according to a preferred embodiment of the present invention will be described while referring to the accompanying drawings.

Figure 1:
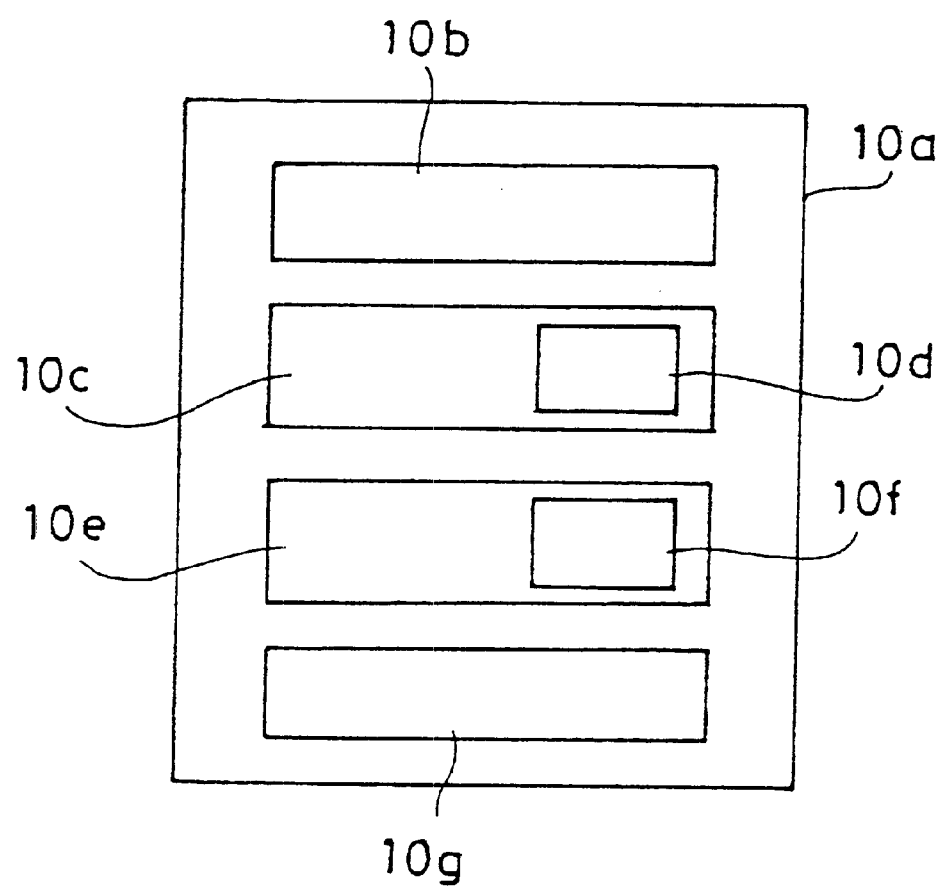
FIG. 1 is an explanatory diagram showing the configuration of an application program for a car racing game according to the present invention that is stored on a CD-ROM.

FIG. 1 shows the construction of an application program 10a of the present invention according to the present embodiment. The application program 10a is stored on a CD-ROM 10. The application program 10a includes a main menu subprogram 10b, a free driving subprogram 10c, a race start determining subprogram 10d, a car racing subprogram 10e, a race winner determining subprogram 10f, and an end-of-race processing subprogram 10g.

Figure 2:
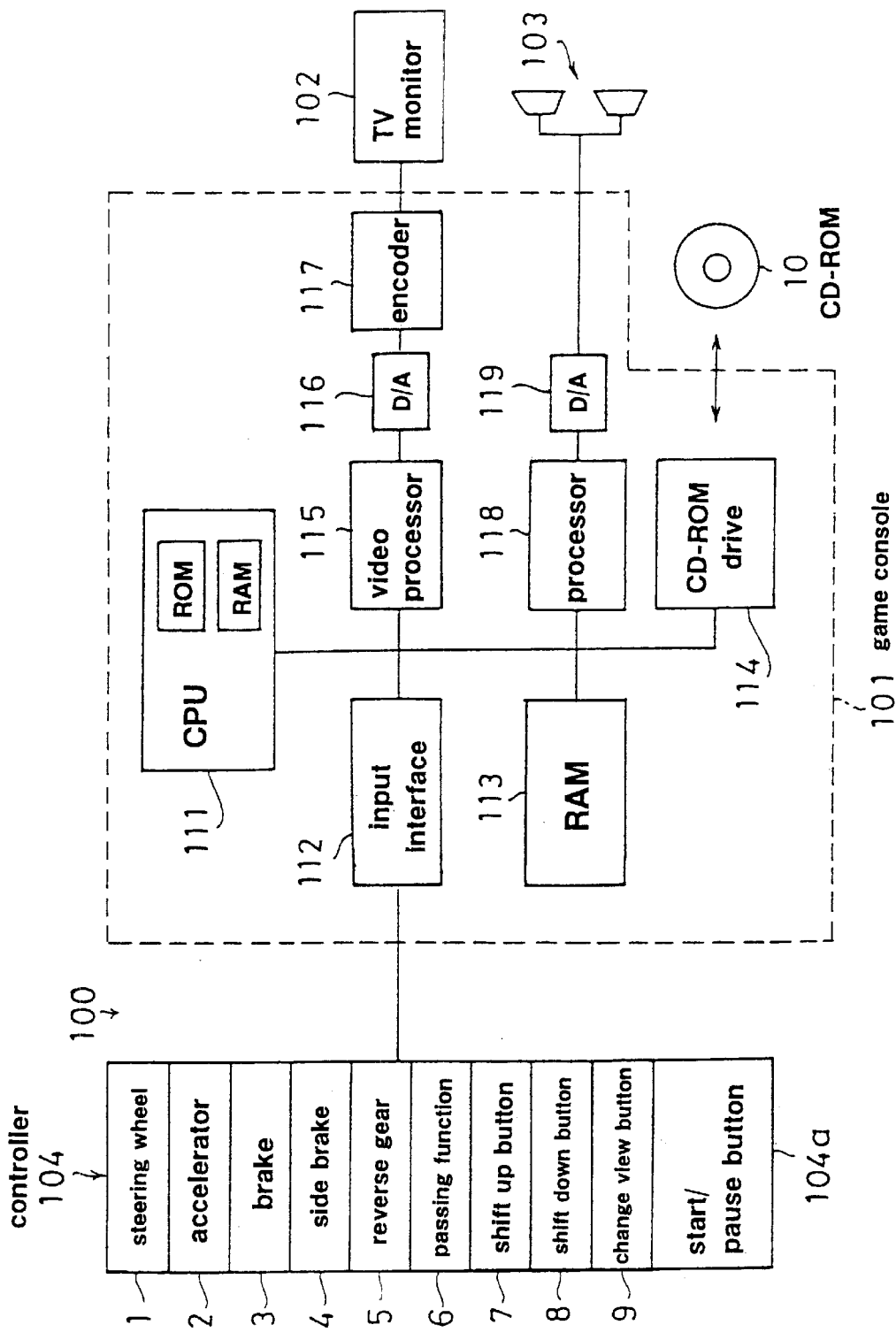
FIG. 2 is a block diagram showing the construction of a game machine.

FIG. 2 is a block diagram showing the configuration of a game machine 100. The game machine 100 includes a game console 101, a controller 104 for inputting control signals into the game console 101, a TV monitor 102 for displaying the game, and speakers 103.

The game console 101 includes a central processing unit (CPU) 111 having a ROM for storing control commands and a RAM serving as the work area; an input interface 112 for providing interface with the controller 104; a RAM 113 serving as an internal memory for storing the application program and capable of saving the data even when the power is shut off; a CD-ROM drive 114 capable of reading the CD-ROM 10; a video processor 115 for outputting image data stored by the CPU 111 to the TV monitor 102; a D/A converter 116 and an encoder 117 for generating video signals from the data transmitted from the video processor 115; an audio processor 118 for outputting audio data stored by the CPU 111 to the speakers 103; and a D/A converter 119 for generating audio signals from the data transmitted from the audio processor 118.

The controller 104 is provided with at least a steering wheel 1, an accelerator 2, a brake 3, a side-brake 4, a reverse gear 5, and a passing function 6 serving as signal input means for operating a car. The controller 104 also includes a start/pause button 104a; as well as a shift up button 7, a shift down button 8, and a change view button 9 for adjusting the display.

The CD-ROM 10 storing the application program of the present invention is inserted into the CD-ROM drive 114. The application program 10a stored on the CD-ROM 10 is loaded into the RAM 113. The RAM 113 includes a backup battery or the like to maintain stored data when the power is turned off.

When power to the game machine 100 is turned on, the game machine 100 starts up and displays a title on the TV monitor 102 after a fixed time has elapsed. At this time, the user presses the start/pause button 104a to display a screen for selecting a racing mode. The game machine 100 determines whether a memory card, file, or the like required for playing the selected racing mode is available and displays the results of this determination. If the memory card, file, or the like is available, data for the racing mode is loaded.

When the application program 10a is selected as the racing mode, a main menu window 11 with a file of the main menu subprogram 10b is displayed. Also, the main menu window 11 is displayed when the user presses the start/pause button 104a to continue a game that had been paused and when the window is loaded while the game is paused from a memory card inserted in an expansion slot.

Figure 3:
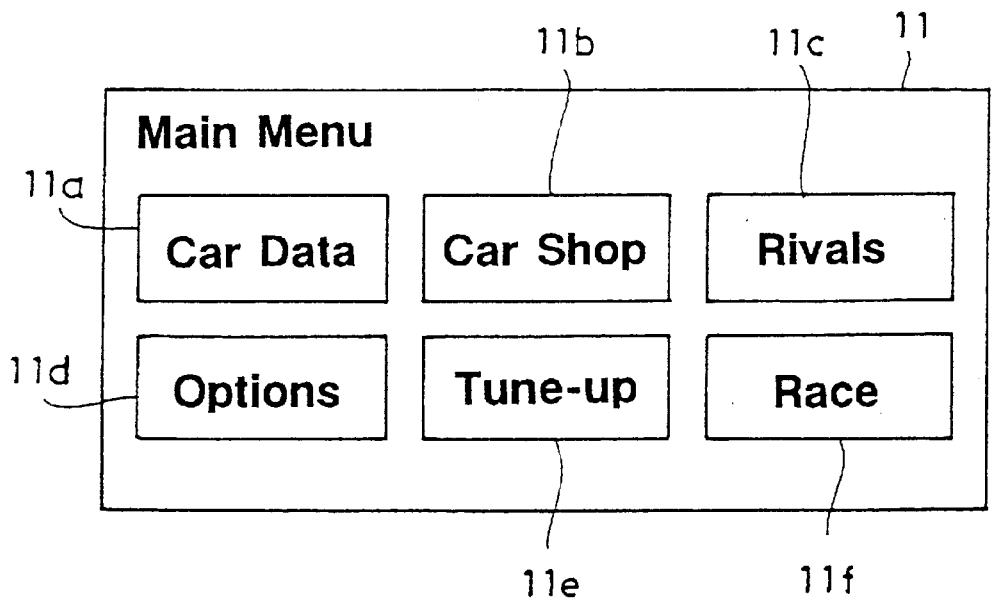
FIG. 3 is an explanatory diagram showing an example of a main menu for the application program of the present invention.

An example of the main menu window 11, as shown in FIG. 3, includes a car data selection 11a that enables the player to select a new car, change the player's name, and the like; a car shop selection lib for purchasing or selling parts; a tune-up selection lie for purchasing, replacing, or testing out parts; an opponents selection 11c for viewing data on opposing cars controlled by the game machine 100; an options selection lid for setting various options regarding the game system and controller; and a race selection 11f for entering the racecourse.

Choosing the race selection 11f executes the free driving subprogram 10c shown in FIG. 1 and displays the player's car driving unrestrictedly on a predetermined racecourse. The player controls the movement of the car with the controller 104 while watching the TV monitor 102 and searches for opposing cars. Here, the game machine 100 serves as the opposing player or players, controlling one or two opposing cars, for example.

While the player is searching for opposing cars, the player's car may close within passing distance of another car or an opposing car may approach the player's car from behind. The race start determining subprogram 10d starts a race from a point on the racecourse when agreement to race between the two cars has been established. An agreement to race is established when the player passes an opposing car and is passed in return or when an opposing car passes the player from behind and the player passes that opposing car in return. In the present embodiment, this passing exchange is the method used to signal intent to race between the player and an opposing car. However, it is also possible to signal intent to race by flashing one's hazard lights instead of by passing, or by using either one or the other method.

Once the race begins, the car racing subprogram 10e is executed. At this time, the race is conducted with the player and opponent attempting to pass each other on the racecourse. The race winner determining program 10f determines the winner of the race, as described below.

At the beginning of the first race, each player has points SP that are initialized to a prescribed value. These points SP are necessary for starting and continuing races. The points SP are adjusted at prescribed periods by calculating the leading and trailing cars and the distance therebetween. A predetermined value corresponding to the distance between cars is subtracted from the points SP of the trailing car. A player wins when the points SP of the opponent reach 0 first. The game ends when one player's points SP reach 0. As described above, one feature of the racing game is that the starting point and finishing point are not fixed. The racecourse can have a loop form or can diverge into parallel branches, for example. However, a race ends if cars separate from each other during a race at a split in the road.

After the race ends, the end-of-race processing subprogram 10g is executed to display the results of the race and show or save a replay of the race. At this time, the player can choose whether to return to the free driving mode, return to the main menu, or end the game.

Next, the race winner determining subprogram 10f will be described in greater detail.

To begin with, the leading and trailing cars are determined and the distance between the cars is calculated at prescribed periods. These prescribed periods can be either one frame (1/60 seconds) for displaying images on the TV monitor 102 or an integral multiple of one frame.

A subtraction value is calculated every frame in the former case and subtracted from the trailing player's points SP, thereby enabling a simple calculation. The subtraction value is smaller when the distance between cars is shorter and larger when the distance between cars is longer. To achieve this, a prescribed length behind the leading car is divided into a plurality of sections, three in this example, each having a primary curve representing the subtraction value in relation to distance from the leading car.

When the trailing car is within the first section, that is the section nearest the leading car, the subtraction value for the distance between cars in this section is calculated using the primary curve having the smallest growth rate. When the trailing car is within the second section behind the leading car, the subtraction value is determined by a primary curve connected to the end of the first primary curve and having a growth rate equal to the mean of those for the primary curves of the first and third sections. When the trailing car is within the third section behind the leading car, the subtraction value is calculated based on a primary curve connected to the end of the second primary curve and having the highest growth rate. This example is illustrated in FIG. 4.

Figure 4:
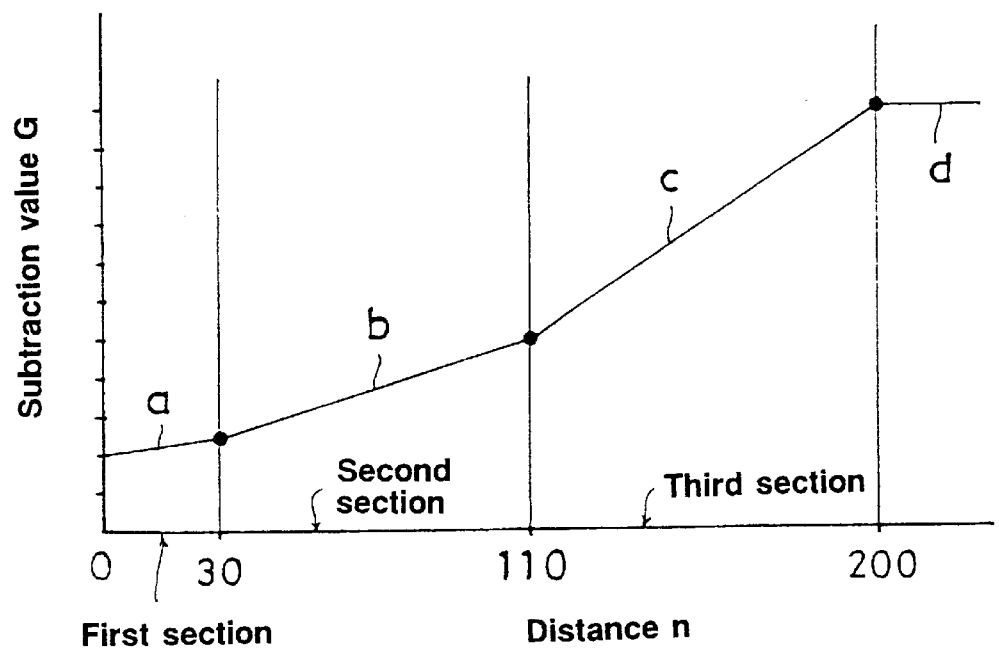
FIG. 4 is a graph showing the amount of points to subtract from a player trailing in the car racing game of the present invention.

In the graph of FIG. 4, the x-axis represents the distance n extending backward from the rear of the leading car, while the y-axis represents the subtraction value G. The units for the distance n are denoted by an integer divided by 50 centimeters, for example.

Subtraction values in the graph are represented by the curves a, b, and c. No value is subtracted when n=0. In the first section, in which 1<n<30, the subtraction value increases in relation to the distance n as shown by the primary curve a. In the second section, in which 31<n<110, the subtraction value increases in relation to the distance n as shown by the primary curve b, wherein the primary curve b increases at a higher ratio than the primary curve a in the first section. In the third section, in which 111<n<200, the subtraction value increases at an even larger growth rate. Note, when n>201, the subtraction value is fixed at a maximum value. The subtraction values are subtracted from the points SP in real-time for each frame.

Points can be subtracted from the points SP for other reasons than the positions of and distance between cars. For example, points can be subtracted when a car contacts or collides with a wall or another car. Consequently, a racecourse containing many twists and turns cannot be won by speed alone.

Figure 5:
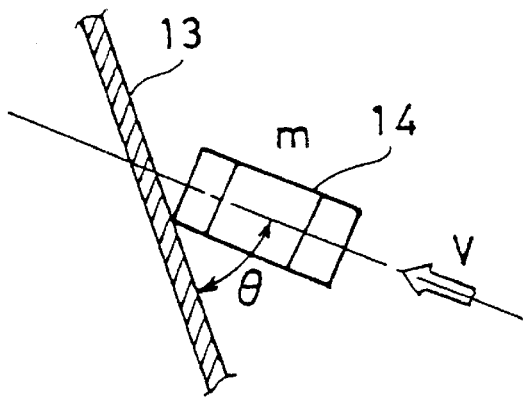
FIG. 5 is an explanatory diagram showing a car colliding with a wall in the car racing game of the present invention.

In this case, the force of collision in a direction perpendicular to a wall or car collided with is calculated at prescribed periods. A value proportional to this collision force is subtracted from the points SP. As described above, the prescribed period is one frame (1/60 seconds) of images displayed on the TV monitor 102. In the example shown in FIG. 5, a car 14 having a mass m (kg) and traveling at a velocity v (m/s) collides with a wall 13 (or another car) while moving at an angle θ thereto. The force of collision in this case is calculated at each frame according to Equation (1) below.

$$\text{Force of collision} = (\tfrac{1}{2})m(v \sin \theta)^2 \quad (1)$$

The subtraction value is calculated according to the product of the force of collision and a prescribed proportional constant R. This subtraction value is subtracted from the points SP at each frame in real-time.

The subtraction value G and the proportional constant R corresponding to the distance n in FIG. 4 can be adjusted to regulate the value per unit time that is subtracted from the points SP based on the distance between cars and the value per unit time that is subtracted due to contact or collision with objects. A large proportional constant R will cause the points SP to drop sharply in the event of a collision. Similarly, larger subtraction values G in sections having a larger distance n will cause the points SP to drop abruptly as the leading car pulls farther away from the trailing car.

Figure 6:
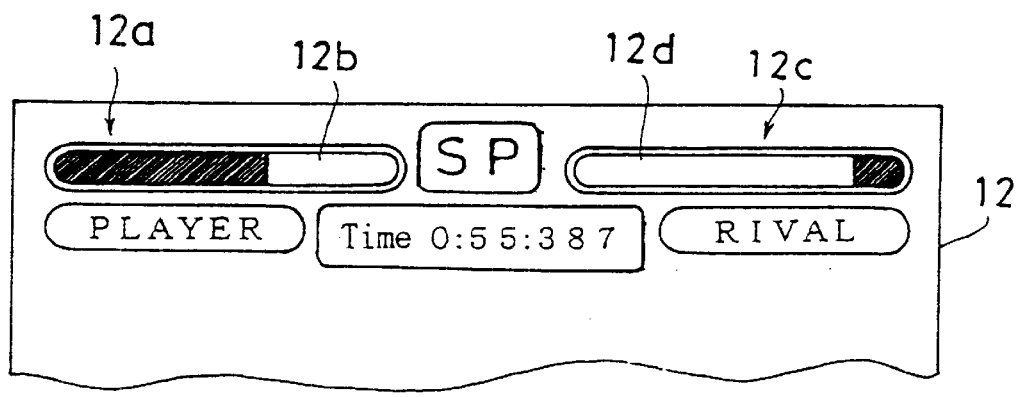
FIG. 6 is an explanatory diagram showing the points SP for each player displayed on the upper part of a game monitor for the car racing game of the present invention.

A race display screen 12, shown in FIG. 6, is displayed on the TV monitor 102 in real-time in order to indicate the points SP for both the player and opponent. As shown in the drawing, the race display screen 12 includes an SP gauge 12a disposed on the left side for indicating the player's points SP and an SP gauge 12c disposed on the right side for indicating the opponent's points SP. The black areas in the SP gauge 12a and SP gauge 12c represent the points that have been subtracted, while the white areas represent a remaining SP 12b and a remaining SP 12d for the player and opponent, respectively. In this example, the remaining SP 12d is larger than the remaining SP 12b, indicating that the opposing player has the advantage.

EXPLANATION OF NUMBERS IN DRAWINGS 1 steering wheel
2 accelerator
3 brake
4 side brake
5 reverse gear
6 passing function
7 shift up button
8 shift down button
9 change view button
10 CD-ROM
10a application program
10b main menu program
10c free driving subprogram
10d race start determining subprogram
10e car racing subprogram
10f race winner determining program
10g end-of-race processing subprogram
11 main menu window
12 race display screen
12a player's SP gauge
12b player's remaining SP
12c opponent's SP gauge
12d opponent's remaining SP
13 wall
14 bicycle
100 game machine
101 game console
102 TV monitor 103 speakers
104 controller
104a start/pause button
111 CPU
112 input interface
113 ram
114 cd-rom drive
115, 118 video processor
116, 119 D/A converter
117 encoder

What is claimed is:

1. A storage medium storing an application program for a car racing game comprising:

a main menu subprogram enabling a player to select a car for racing, change car parts, view information on opposing cars, change a functional arrangement of controller buttons before the player begins driving on a predetermined racecourse;

a free driving subprogram enabling the player to drive freely on a predetermined racecourse while searching for opponents until a race begins;

a car racing subprogram for implementing passing and other aspects of a race from a point the race between the player and an opponent begins until the end of the race; and an end-of-race processing subprogram for displaying results of the race, displaying or saving a replay of the race, and allowing the player to select whether to return to free driving or to the main menu;

wherein the car racing subprogram includes a race result determining subprogram for providing players with an initial point value at the beginning of a first race to enable the players to start and continue races, determining a positional relationship between cars and calculating the distance there between at prescribed periods, decreasing points of a car trailing a leading car by a predetermined subtraction value corresponding to the distance between the cars, and determining a winner of the race when the opponent's points drop to 0 and ending the race at that point.

2. A storage medium storing an application program for a car racing game as recited in claim 1, wherein the free driving subprogram comprises a race start determining subprogram for starting a race from a point on the racecourse at which either the player passes an opposing car and is passed by the same opposing car in return or an opposing car passes the player and the player passes the same opposing car in return.

3. A storage medium storing an application program for a car racing game as recited in claim 1, wherein the free driving subprogram comprises a race start determining subprogram for starting a race from a point on the racecourse at which either the player flashes hazard lights at an opposing car or passes an opposing car and the same opposing car flashes hazard lights or passes the player in return, or an opposing car flashes hazard lights or passes the player and the player flashes hazard lights or passes the same opposing car in return.

4. A storage medium storing an application program for a car racing game as recited in claims 2 or 3, wherein a predetermined subtraction value is subtracted from a player's points in a race result determining subprogram based on the distance between cars and is a lower value when the distance between cars is small and a higher value when the distance between cars is great.

5. A storage medium storing an application program for a car racing game as recited in claim 4, wherein the subtraction value subtracted from a player's points is calculated by dividing the distance behind the leading car into a plurality of sections, each having a primary curve representing the subtraction value that grows at a different rate as the distance behind the leading car increases, such that the primary curve having the smallest growth rate is used to determine the subtraction value for a trailing car in a first section nearest the leading car and primary curves having progressively larger growth rates are used to determine the subtraction value for a trailing car in a second or subsequent section farther from the leading car.

6. A storage medium storing an application program for a car racing game as recited in claim 5, wherein the points used in the race result determining subprogram are further decreased when a car contacts or collides with a wall or other car by a subtraction value proportional to a force of collision perpendicular to the wall or other car.

7. A storage medium storing an application program for a car racing game as recited in claim 6, wherein the force of collision perpendicular to the wall or other car collided with is calculated by the expression $(\frac{1}{2})m(v \sin \theta)^2$ at prescribed periods when a car having a mass m and moving at a velocity v contacts or collides with the wall or other car at an angle $\theta$, and a subtraction value proportional to the calculated force of collision is subtracted from the points used in the race result determining subprogram.

8. A storage medium storing an application program for a car racing game as recited in claim 7, wherein the prescribed time is 1/60 seconds, corresponding to the time for one frame to be displayed, or an integral multiple thereof.

9. A storage medium according to claim 1 comprising a CD-ROM, a DVD-ROM, or a ROM having a higher storage density than a CD-ROM with a capacity of at least 1 gigabyte per disc.

10. A storage medium storing an application program for a car racing game as recited in claim 3, wherein a predetermined subtraction value is subtracted from a player's points in a race result determining subprogram based on the distance between cars and is a lower value when the distance between cars is small and a higher value when the distance between cars is great.

* * * * *